US012686499B2

(12) United States Patent
Ferret

(10) Patent No.: US 12,686,499 B2
(45) Date of Patent: Jul. 21, 2026

(54) AIRCRAFT PORTION WITH MODULAR FLUID DISTRIBUTION AND ASSOCIATED ARRANGEMENT METHOD

(71) Applicant: DASSAULT AVIATION, Paris (FR)

(72) Inventor: Stéphane Ferret, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 42 days.

(21) Appl. No.: 18/889,999

(22) Filed: Sep. 19, 2024

(65) Prior Publication Data

US 2026/0084822 A1     Mar. 26, 2026

(30) Foreign Application Priority Data

Sep. 21, 2023    (FR) ...................................... 2309996

(51) Int. Cl.
*B64D 13/00*          (2006.01)
*B64C 1/06*           (2006.01)
*B64F 5/10*           (2017.01)

(52) U.S. Cl.
CPC .............. *B64D 13/00* (2013.01); *B64C 1/068* (2013.01); *B64F 5/10* (2017.01)

(58) Field of Classification Search
CPC ............ B64D 13/00; B64C 1/068; B64F 5/10
See application file for complete search history.

(56) References Cited

U.S. PATENT DOCUMENTS

| | | | | |
|---|---|---|---|---|
| 5,479,983 | A | * | 1/1996 | Fischer ................. B64D 13/08 |
| | | | | 244/118.6 |
| 2008/0139100 | A1 | | 6/2008 | Horstman et al. |
| 2008/0168786 | A1 | | 7/2008 | Eichholz et al. |
| 2009/0298408 | A1 | * | 12/2009 | Reisbach ............... B64D 13/00 |
| | | | | 454/76 |

OTHER PUBLICATIONS

Search Report for priority application FR 2309996.

* cited by examiner

*Primary Examiner* — Valentina Xavier

(74) *Attorney, Agent, or Firm* — Davidson Kappel LLC

(57)          ABSTRACT

An aircraft portion with modular fluid distribution and associated arrangement method includes a wall, mounted at a first or second coordinate, configured to separate first and second cabin portions and a circuit fluidly connecting a source and the second cabin portion. The circuit fluidly connecting a source, and the second cabin portion further includes a pipe, the pipe further including a first section delivering fluid between the first and second coordinates, a second section delivering fluid to the rear of the second coordinate and a control device. The control device is intendent to be in the open configuration or the closed configuration. In the open configuration, the first and second sections are in fluid communication, when the wall is mounted at the first coordinate or the closed. In the closed configuration, the fluid communication is interrupted, when the wall is mounted at the second coordinate.

16 Claims, 8 Drawing Sheets

AIRCRAFT PORTION WITH MODULAR FLUID DISTRIBUTION AND ASSOCIATED ARRANGEMENT METHOD

The present disclosure relates to an aircraft portion comprising:

- a fuselage delimiting a cabin extending according to a longitudinal axis, the cabin comprising a first cabin portion and a second cabin portion;
- a first partition wall extending substantially perpendicular to the longitudinal axis and being intended to separate the first cabin portion and the second cabin portion, the first partition wall being able to be mounted on the fuselage at a first longitudinal coordinate or at a second longitudinal coordinate along the longitudinal axis, the second longitudinal coordinate being located to the rear of the first longitudinal coordinate relative to an orientation direction substantially parallel to the longitudinal axis; and
- at least a first fluid circuit for fluidly connecting at least a first source of a first fluid and the second cabin portion.

BACKGROUND

In particular, the fluid supplied by the first fluid source is air (having, for example, specific characteristics such as a defined temperature, and/or a defined pressure, etc.), the air being intended to be blown into the second cabin portion.

In such an aircraft portion, it is often desirable to have an independent air supply between each cabin portion separated by a partition wall. In particular, it may be desired to blow air presenting certain characteristics into a first cabin portion and air presenting different characteristics into a second cabin portion. It is therefore necessary to adapt the fluid circuit as a function of the position in which the first partition wall is mounted, in order to achieve this independence.

However, in some aircraft, the cabin configuration is modular. The partition walls can be positioned at different points within the cabin according to the wishes of the customer, and consequently the lengths of the cabin partition vary as a function of these wishes.

Furthermore, during the life of the aircraft, the partition walls can be dismantled and reassembled elsewhere in the cabin in order to adapt the size of the cabin portions to the wishes of the passengers, particularly in the case of a change of ownership.

Following such a change of configuration, it is necessary to adapt the fluid circuit as a function of the new position in which the partition wall is mounted. This adaptation work is tedious and may require the replacement of fluid circuits.

SUMMARY

One aim of the current disclosure is therefore to propose an aircraft portion in which each fluid circuit is easily adaptable as a function of the position in which each partition wall is installed.

To this end, the current disclosure has as its object an aircraft portion comprising:

- a fuselage delimiting a cabin extending according to a longitudinal axis, the cabin comprising a first cabin portion and a second cabin portion;
- a first partition wall intended to extend substantially perpendicular to the longitudinal axis and to separate the first cabin portion and the second cabin portion, the first partition wall being able to be mounted on the fuselage at a first longitudinal coordinate or at a second longitudinal coordinate along the longitudinal axis, the second longitudinal coordinate being located to the rear of the first longitudinal coordinate relative to an orientation direction substantially parallel to the longitudinal axis;

- at least one first fluid circuit intended to be fluidly connected to at least one first source of a first fluid and the second cabin portion, the at least one first fluid circuit comprising:
  - at least one first pipe including:
    - a first section comprising at least one first outlet able to deliver the first fluid into the cabin between the first longitudinal coordinate and the second longitudinal coordinate;
    - a second section comprising at least one second outlet able to deliver the first fluid into the cabin to the rear of the second longitudinal coordinate relative to the orientation direction, the first section of the at least one first pipe being intended to be fluidly connected to the at least one first source by the second section of the at least one first pipe;
  - at least one first control device configurable between an open configuration, in which the first section of the at least one first pipe is in fluid communication with the second section of the at least one first pipe, and a closed configuration, in which fluid communication between the first section of the at least one first pipe and the second section of the at least one first pipe is interrupted;

wherein:

- the at least one first control device of the at least one first fluid circuit is intended to be in the open configuration when the first partition wall is mounted at the first longitudinal coordinate;
- the at least one first control device of the at least one first fluid circuit is intended to be in a closed configuration when the first partition wall is mounted at the second longitudinal coordinate.

Thanks to the current disclosure, the first fluid circuit is easily adaptable as a function of the position in which the first partition wall is installed, by configuring the first fluid flow control device in the open configuration or in the closed configuration. There is then no need to provide separate fluid circuits for each cabin configuration.

According to other advantageous aspects of the current disclosure, the aircraft portion comprises one or more of the following features, taken alone or in any technically possible combination:

- the aircraft portion is such that:
- the first partition wall is furthermore able to be mounted on the fuselage at a third longitudinal coordinate, the third longitudinal coordinate being located to the rear of the second longitudinal coordinate relative to the orientation direction;
- the at least one second outlet is able to deliver the first fluid into the cabin between the second longitudinal coordinate and the third longitudinal coordinate;
- the at least one first pipe includes a third section comprising at least one third outlet able to deliver the first fluid into the cabin to the rear of the third longitudinal coordinate relative to the orientation direction, the second section of the at least one first pipe being intended to be fluidly connected to the at least one first source by the third section of the at least one first pipe;
- the at least one first fluid circuit further comprises at least one second control device configurable between an open configuration, in which the second section of the at least one first pipe is in fluid communication with the third section of the at least one first pipe, and a closed configuration, in which fluid communication between the second section of the at least one first pipe and the third section of the at least one first pipe is interrupted;

wherein:

when the at least one first partition wall is mounted at the second longitudinal coordinate or at the first longitudinal coordinate, the at least one second control device of the at least one first fluid circuit is intended to be in the open configuration;

when the first partition wall is mounted at the third longitudinal coordinate, the at least one second control device of the at least one first fluid circuit is intended to be in the closed configuration;

the aircraft portion is such that:

the cabin comprises a third cabin portion, the aircraft portion further comprising:

a second partition wall intended to extend substantially perpendicular to the longitudinal axis and intended to separate the third cabin portion and the second cabin portion, the second partition wall being able to be mounted on the fuselage at a fourth longitudinal coordinate or at a fifth longitudinal coordinate, the fourth longitudinal coordinate being located to the rear of the third longitudinal coordinate relative to the orientation direction, the fifth longitudinal coordinate being located to the rear of the fourth longitudinal coordinate relative to the orientation direction;

at least one second fluid circuit intended to fluidly connect at least one second source of a second fluid and the third cabin portion, the at least one second fluid circuit comprising:

at least one second pipe including:

a first section comprising at least one first outlet able to deliver the second fluid into the cabin between the fourth longitudinal coordinate and the fifth longitudinal coordinate;

a second section comprising at least one second outlet able to deliver the second fluid into the cabin to the rear of the fifth longitudinal coordinate relative to the orientation direction, the first section of the at least one second pipe being intended to be fluidly connected to the at least one second source by the second section of the at least one second pipe;

at least one control device configurable between an open configuration, in which the first section of the at least one second pipe is in fluid communication with the second section of the at least one second pipe, and a closed configuration, in which fluid communication between the first section of the at least one second pipe and the second section of the at least one second pipe is interrupted;

wherein:

the at least one control device of the at least one second fluid circuit is intended to be in the open configuration when the second partition wall is mounted at the fourth longitudinal coordinate;

the at least one control device of the at least one second fluid circuit is intended to be in a closed configuration when the second partition wall is mounted at the fifth longitudinal coordinate;

the aircraft portion is such that:

the third section of the at least one first pipe is intended to be fluidly connected to the at least one first source, the first section of the at least one second pipe is intended to be fluidly connected to the third section of the at least one first pipe, the at least one second fluid pipe including at least one intermediate control device configurable between an open configuration, in which the first section of the at least one second pipe is in fluid communication with the third section of the at least one first pipe, and a closed configuration, in which fluid communication between the first section of the at least one second pipe and the third section of the at least one first pipe is interrupted, wherein:

when the second partition wall is mounted at the fourth longitudinal coordinate, the at least one intermediate control device of the at least one second fluid circuit is intended to be in the closed configuration;

when the second partition wall is mounted at the fifth longitudinal coordinate, the at least one intermediate control device of the at least one second fluid circuit is intended to be in the open configuration;

the aircraft portion further comprises:

at least one auxiliary fluid circuit intended to be fluidly connected to at least one third source of a third fluid and the first cabin portion, the at least one auxiliary fluid circuit comprising at least one auxiliary pipe including a section comprising at least one outlet able to deliver the third fluid into the cabin in front of the first longitudinal coordinate relative to the orientation direction, the section of the at least one auxiliary pipe being intended to be fluidly connected to the at least one third source;

the first section of the at least one first pipe being intended to be fluidly connected to the section of the at least one auxiliary pipe, the at least one first fluid circuit including at least one intermediate control device configurable between an open configuration, in which the first section of the at least one first pipe is in fluid communication with the section of the at least one auxiliary pipe, and a closed configuration, in which fluid communication between the first section of the at least one first pipe and the section of the at least one auxiliary pipe is interrupted, wherein:

when the first partition wall is mounted at the first longitudinal coordinate, the at least one intermediate control device of the at least one first fluid circuit is intended to be in the closed configuration;

when the first partition wall is mounted at the second longitudinal coordinate, the at least one intermediate control device of the at least one first fluid circuit is intended to be in the open configuration;

when the first partition wall is mounted at the third longitudinal coordinate, the at least one intermediate control device of the at least one first fluid circuit is intended to be in the open configuration;

the aircraft portion is such that each control device comprises:

a support permanently mounted on the corresponding sections of the corresponding pipe(s) so as to fluidly connect the corresponding sections of the corresponding pipe(s); and a control assembly comprising:

a closing element able to be removably mounted on said support so as to interrupt fluid communication between the corresponding sections of the corresponding pipe (s); and a covering element able to be removably mounted on said support in place of the closing element so as to allow fluid communication between the corresponding sections of the corresponding pipe(s); and wherein each control device is:

in a closed configuration when the closing element is mounted on said support;

in an open configuration when the covering element is mounted on said support;

the aircraft portion is such that the support for each control device comprises a tubular wall delimiting a fluid flow passage between the corresponding sections of the corresponding pipe(s), the tubular wall of each control device support comprising an insertion slot, the closing element of each control device comprising an interruption plate intended to be inserted into said fluid flow passage through said insertion slot so as to interrupt the fluid communication between the corresponding sections of the corresponding pipe(s) when the closing element is mounted on said support;

the aircraft portion is such that the covering element of each control device comprises a cover intended to close the insertion slot when the covering element is mounted on said support;

the aircraft portion is such that each control device comprises a seal arranged around the corresponding insertion slot, the closing element, respectively the covering element, cooperating with the corresponding seal when the closing element, respectively the covering element, is mounted on the support, so as to prevent the passage of fluid through the insertion slot;

the aircraft portion is such that the closing element and the covering element of each control device are each able to be mounted on said support by screwing;

the aircraft portion is such that the closing element, respectively the covering element, of each control device comprises an inner surface oriented in the direction of the support when said closing element, respectively said covering element, is mounted on said support, and an outer surface opposite to the inner surface, the outer surface of said closing element including a closed configuration indicator and the outer surface of said covering element including an open configuration indicator different from the closed configuration indicator.

The current disclosure further relates to an arrangement method for at least one aircraft portion such as described above, comprising the following steps:

a) mounting the first partition wall at the first longitudinal coordinate and configuring the at least one first control device of the at least one first fluid circuit in the open configuration; or b) mounting the first partition wall at the second longitudinal coordinate and configuring the at least one first control device of the at least one first fluid circuit in the closed configuration.

According to further advantageous aspects of the current disclosure, the method comprises one or more of the following features, taken alone or in any technically possible combinations:

during step b), at least one second control device of the at least one first fluid circuit is configured in the open configuration so that the second section of the at least one first pipe is in fluid communication with a third section of the at least one first pipe, the third section comprising at least one third outlet able to deliver the first fluid into the cabin to the rear of a third longitudinal coordinate relative to the orientation direction, the second section of the at least one first pipe being intended to be fluidly connected to the at least one first source by the third section of the at least one first pipe, the third longitudinal coordinate being to the rear of the second longitudinal coordinate relative to the orientation direction, the method further comprising, as an alternative to steps a) and b), the following step:

c) mounting the first partition wall at the third longitudinal coordinate and configuring the at least one second control device of the at least one first fluid circuit in a closed configuration in which fluid communication between the second section of the at least one first pipe and the third section of the at least one first pipe is interrupted;

the method further comprises the following step:

d) mounting a second partition wall at a fourth longitudinal coordinate so that the second partition wall extends substantially perpendicular to the longitudinal axis and separates a third cabin portion and the second cabin portion, the fourth longitudinal coordinate being located to the rear of the third longitudinal coordinate relative to the orientation direction, and configuration of at least one control device of the at least one second fluid circuit in an open configuration in which a first section of at least one second pipe of the at least one second fluid circuit is in fluid communication with a second section of the at least one second pipe, the first section of the at least one second pipe comprising at least one first outlet able to deliver a second fluid into the cabin between the fourth longitudinal coordinate and a fifth longitudinal coordinate located to the rear of the fourth longitudinal coordinate relative to the orientation direction, the second section of the at least one second pipe comprising at least one second outlet able to deliver the second fluid into the cabin to the rear of the fifth longitudinal coordinate relative to the orientation direction, the first section of the at least one second pipe being intended to be fluidly connected to at least one second source of the second fluid by the second section of the at least one second pipe;

the method further comprises, as an alternative to step d), the following step:

e) mounting the second partition wall at the fifth longitudinal coordinate so that the second partition wall extends substantially perpendicular to the longitudinal axis and separates the third cabin portion and the second cabin portion, and configuration of the at least one control device of the at least one second fluid circuit in a closed configuration in which fluid communication between the first section of the at least one second pipe and the second section of the at least one second pipe is interrupted;

during step d), at least one intermediate control device of the at least one second fluid circuit is configured in a closed configuration so that fluid communication between the first section of the at least one second pipe and the third section of the at least one first pipe is interrupted, the third section of the at least one first pipe being intended to be fluidly connected to the at least one first source; and during step e), the at least one intermediate control device of the at least one second fluid circuit is configured in an open configuration so that the first section of the at least one second pipe is in fluid communication with the third section of the at least one first pipe;

after step a), at least one intermediate control device of the at least one first fluid circuit is configured in a closed configuration so that fluid communication between the first section of the at least one first pipe and a section of at least one auxiliary pipe of the at least one auxiliary fluid circuit is interrupted, the at least one auxiliary fluid circuit being intended to fluidly connect at least one third source of a third fluid and the first cabin portion, the at least one auxiliary fluid circuit comprising at least one auxiliary pipe including a section comprising at least one outlet able to deliver the third fluid into the cabin in front of the first longitudinal coordinate relative to the orientation direction, the section of the at least one auxiliary pipe being intended to be fluidly connected to the at least one third source, the first section of the at least one first pipe being intended to be fluidly connected to the section of the at least one auxiliary pipe;

after step b), the at least one intermediate control device of the at least one first fluid circuit is configured in an open configuration so that the first section of the at least one first pipe is in fluid communication with the section of the at least one auxiliary pipe;

after step c), the at least one intermediate control device of the at least one first fluid circuit is configured in an open configuration so that the first section of the at least one first pipe is in fluid communication with the section of the at least one auxiliary pipe;

the method comprises:

for a first aircraft portion of a first aircraft, mounting the first partition wall at the first longitudinal coordinate and configuring the at least one first control device of the at least one first fluid circuit in the open configuration; and for a second aircraft portion of a second aircraft, mounting the first partition wall at the second longitudinal coordinate and configuring the at least one first control device of the at least one first fluid circuit in the closed configuration;

the at least one first pipe of the first fluid circuit of the first aircraft portion being identical to the at least one first pipe of the first fluid circuit of the second aircraft portion.

BRIEF SUMMARY OF THE DRAWINGS

The current disclosure will become clearer on reading the following description, given solely by way of non-limiting example, and made with reference to the drawings wherein.

DETAILED DESCRIPTION

Figure 1:
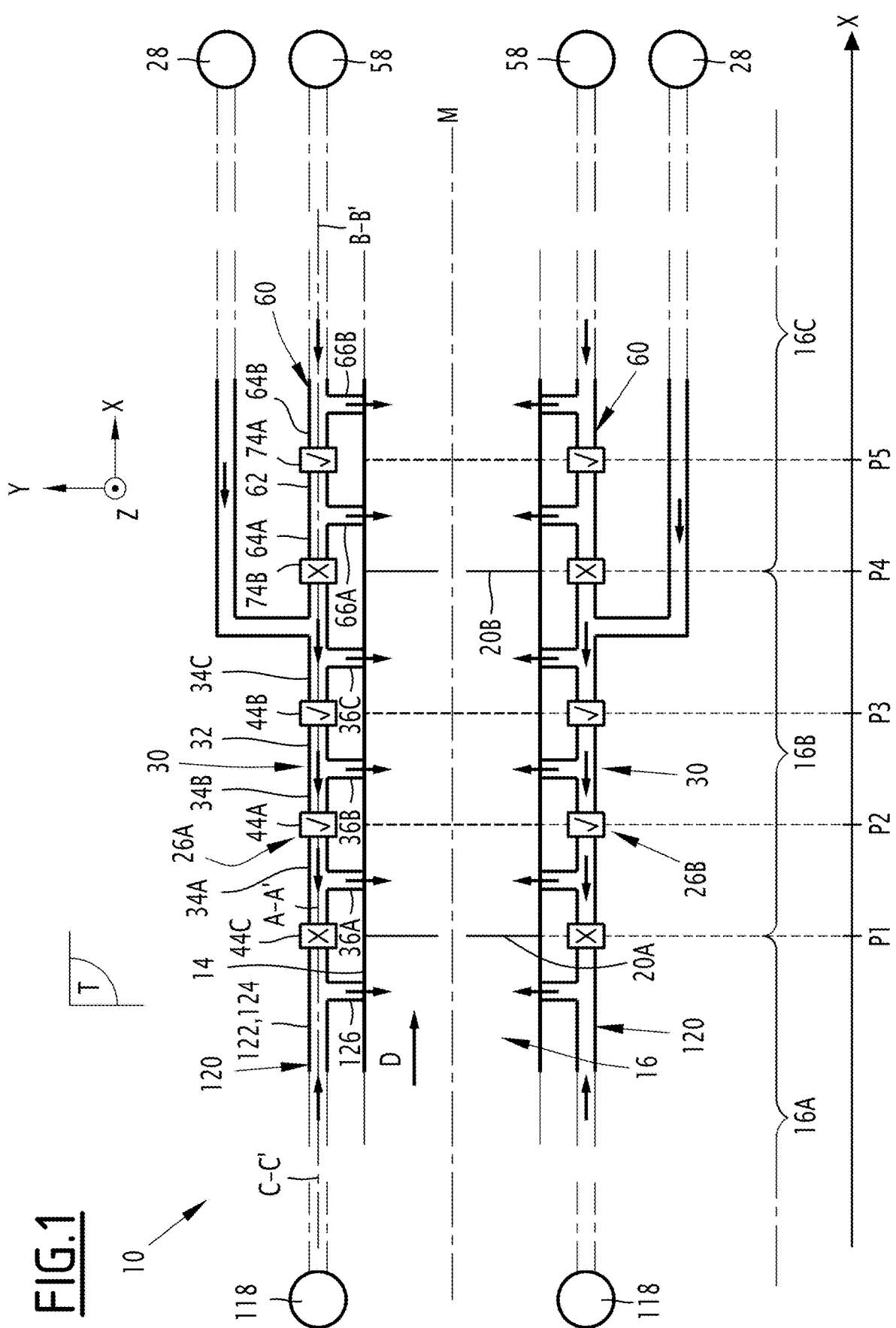
FIG. 1 is a simplified schematic representation of the lower part of an aircraft portion according to the current disclosure, in which a first partition wall is mounted on the fuselage at a first longitudinal coordinate, a second partition wall is mounted on the fuselage at a fourth longitudinal coordinate, a first control device of the two first fluid circuits being in the open configuration, a second control device of the first two fluid circuits being in the open configuration, an intermediate control device of the first two fluid circuits being in the closed configuration, a first control device of two second fluid circuits being in the open configuration, an intermediate control device of the second two fluid circuits being in the closed configuration.

With reference to FIGS. 1 to 7, an aircraft portion 10 according to the current disclosure is described.

The aircraft portion 10 comprises a fuselage 14, a first partition wall 20A and at least one first fluid circuit 30.

Advantageously, the aircraft portion 10 further comprises at least one first source 28 of a first fluid.

Even more advantageously, the aircraft portion 10 further comprises a second partition wall 20B and at least one second fluid circuit 60.

Even more advantageously, the aircraft portion 10 further comprises at least one second source 58 of a second fluid.

Figure 2:
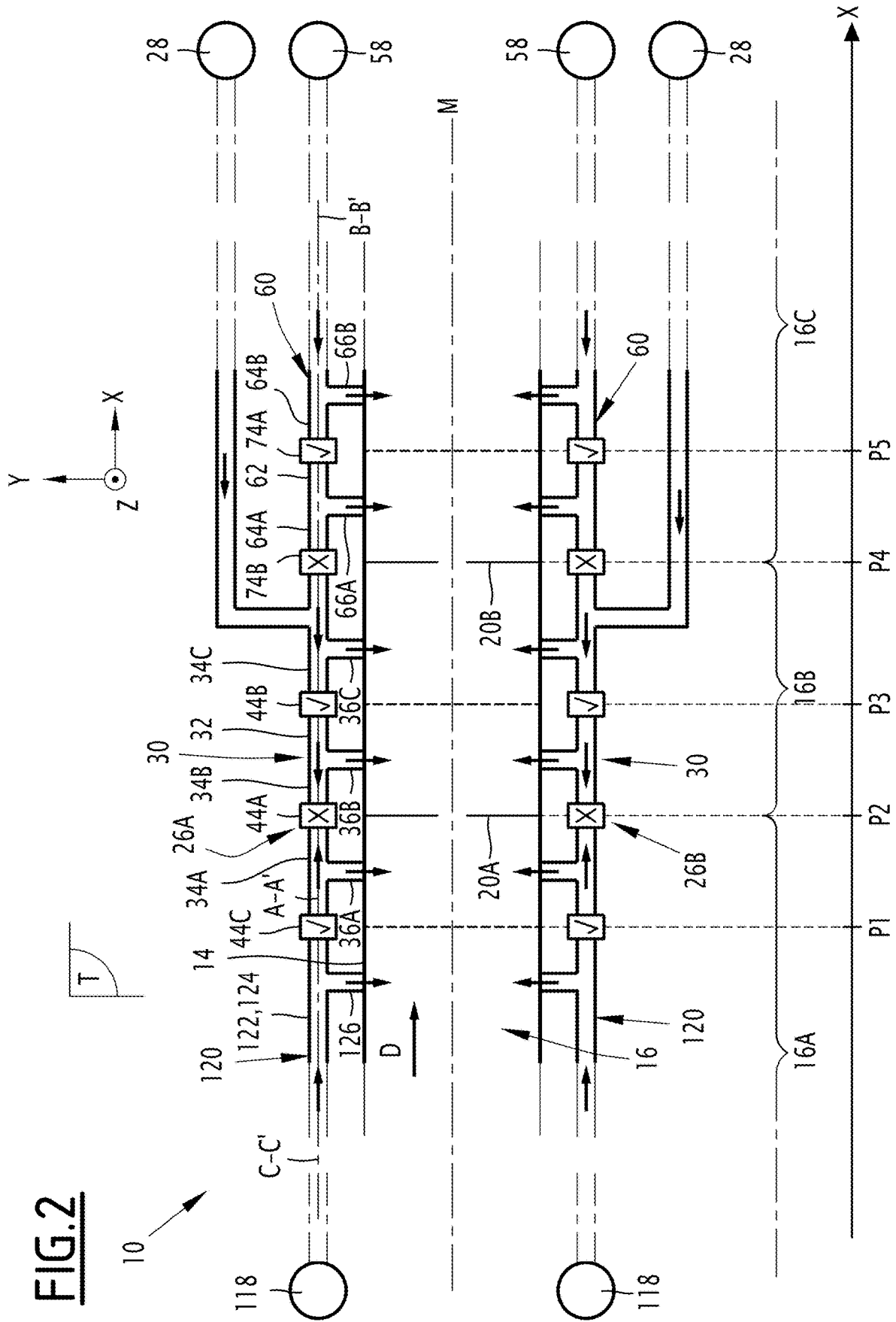
FIG. 2 is a simplified schematic representation of the aircraft portion of FIG. 1, wherein the first partition wall is mounted on the fuselage at a second longitudinal coordinate, the second partition wall is mounted on the fuselage at the fourth longitudinal coordinate, the first control device of the first two fluid circuits being in the closed configuration, the second control device of the first two fluid circuits being in the open configuration, the intermediate control device of the first two fluid circuits being in the open configuration, the first control device of the second two fluid circuits being in the open configuration, the intermediate control device of the second two fluid circuits being in the closed configuration.
Figure 3:
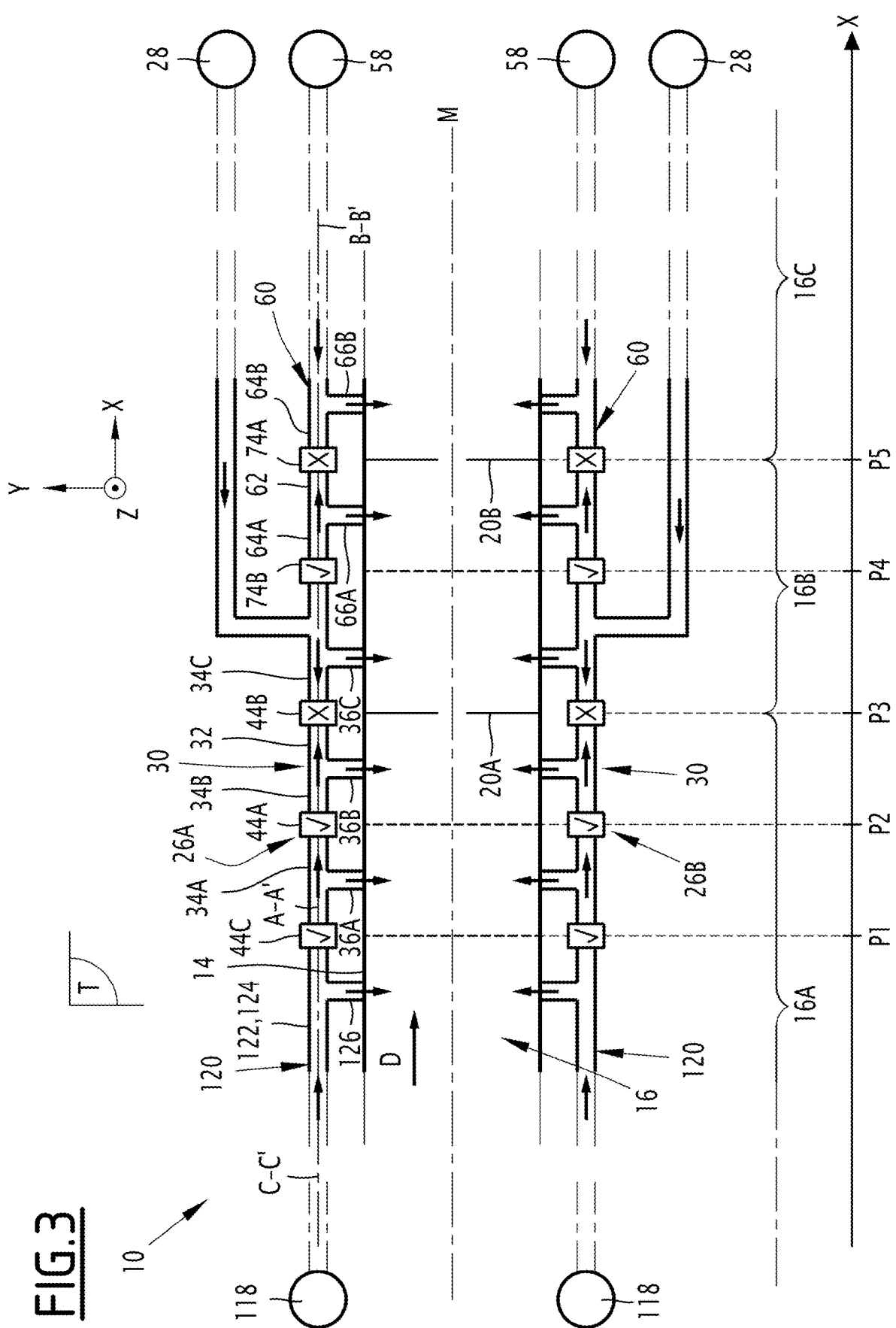
FIG. 3 is a simplified schematic representation of the aircraft portion of FIG. 1, wherein the first partition wall is mounted on the fuselage at a third longitudinal coordinate, the second partition wall is mounted on the fuselage at a fifth longitudinal coordinate, the first control device of the first two fluid circuits being in the open configuration, the second control device of the first two fluid circuits being in the closed configuration, the intermediate control device of the first two fluid circuits being in the open configuration, the first control device of the second two fluid circuits being in the closed configuration, the intermediate control device of the second two fluid circuits being in the open configuration.

As illustrated in the examples of FIGS. 1 to 3, the aircraft portion 10 further comprises at least one third source 118 of a third fluid and at least one auxiliary fluid circuit 120.

In the following, except where explicitly stated otherwise, a single first fluid circuit 30 and if applicable a single first fluid source 28, a single second fluid circuit 60, a single second fluid source 58, a single third fluid source 118 and a single auxiliary fluid circuit 120 are described. Of course, the invention also relates to an aircraft portion 10 comprising a plurality of first fluid circuits 30, if applicable, a plurality of first fluid sources 28, a plurality of second fluid circuits 60, a plurality of second fluid sources 58, a plurality of third fluid sources 118 and/or a plurality of auxiliary fluid circuits 120 (as illustrated in the examples of FIGS. 1 to 3).

With reference to FIGS. 1 to 3, the fuselage 14 delimits a cabin 16 extending according to a longitudinal axis X.

A front-to-rear orientation direction D is defined, substantially parallel to the longitudinal axis X. The terms "front" and "rear" are defined in relation to the orientation direction D (the orientation direction D points toward the "rear"). The orientation direction D is directed from a first longitudinal end of the fuselage 14 toward a second, opposite longitudinal end of fuselage 14.

In the example shown in FIGS. 1 to 3, the orientation direction D is directed from one end of the aircraft portion 10 oriented toward the nose of the aircraft toward one end of the aircraft portion 10 oriented toward the tail of the aircraft. Of course, the invention also applies in the case where the orientation direction D is directed from an end of the aircraft portion 10 oriented toward the tail of the aircraft toward an end of the aircraft portion 10 oriented toward the nose of the aircraft.

With reference to FIGS. 1 to 3, the fuselage 14 presents a median longitudinal plane M extending according to the longitudinal axis X and a vertical axis Z oriented from the bottom toward the top, said median longitudinal plane M forming in particular a plane of symmetry of the fuselage 14. The median longitudinal plane M also forms a median longitudinal plane of the aircraft portion 10, which is advantageously substantially symmetrical relative to this plane M. The fuselage 14 separates a left and a right part of the aircraft portion 10.

The fuselage 14 also presents a transverse plane T extending according to the longitudinal axis X and a transverse axis Y oriented from the left toward the right of the aircraft portion 10. The transverse plane T separates a lower and an upper part of the aircraft portion 10.

For example, the aircraft portion 10 comprises a first assembly 26A including a first fluid circuit 30 and, if applicable, a first fluid source 28, a second fluid circuit 60, a second fluid source 58, a third fluid source 118, an auxiliary fluid circuit 120, in the lower right part of the aircraft portion 10.

Advantageously, the aircraft portion 10 also comprises a second assembly 26B including a first fluid circuit 30 and, if applicable, a first fluid source 28, a second fluid circuit 60, a second fluid source 58, a third fluid source 118, an auxiliary fluid circuit 120, in the lower left part of the aircraft portion 10, for example arranged substantially symmetrically to the first assembly 26A relative to the median longitudinal plane M.

More advantageously, the aircraft portion 10 further comprises a third assembly (not shown) including a first fluid circuit and, if applicable, a first fluid source, a second fluid circuit, a second fluid source, a third fluid source, an auxiliary fluid circuit, in the upper right part of the aircraft portion 10, for example arranged substantially symmetrical to the first assembly 26A relative to the transverse plane T.

Even more advantageously, the aircraft portion 10 further comprises a fourth assembly (not shown) including a first fluid circuit and, and, if applicable, a first fluid source, a second fluid circuit, a second fluid source, a third fluid source, an auxiliary fluid circuit, in the upper left part of the aircraft portion 10, for example arranged substantially symmetrically to the second assembly 26B relative to the transverse plane T.

According to a particular example, the first assembly 26A and the second assembly 26B comprise a second fluid circuit 60 and a second fluid source 58, and the third assembly and the fourth assembly are devoid of a second fluid circuit 60 and a second fluid source 58.

The cabin 16 comprises a first cabin portion 16A and a second cabin portion 16B.

Advantageously, the cabin 16 further comprises a third cabin portion 16C.

Advantageously, as illustrated in FIGS. 1 to 3, the third cabin portion 16C is to the rear of the second cabin portion 16B, which itself is to the rear of the first cabin portion 16A, relative to the orientation direction D.

The first partition wall 20A is able to be mounted on the fuselage 14 at a first longitudinal coordinate P1 or at a second longitudinal coordinate P2, along the longitudinal axis X.

Advantageously, the first partition wall 20A is also able to be mounted on the fuselage 14 at a third longitudinal coordinate P3, along the longitudinal axis X.

As illustrated in FIGS. 1 to 3, the second longitudinal coordinate P2 is to the rear of the first longitudinal coordinate P1, relative to the orientation direction D, and the third longitudinal coordinate P3 is to the rear of the second longitudinal coordinate P2, relative to the orientation direction D.

The first partition wall 20A is intended to extend substantially perpendicular to the longitudinal axis X and to separate the first cabin portion 16A and the second cabin portion 16B, particularly when the first partition wall 20A is mounted on the fuselage 14.

The second partition wall 20B is able to be mounted on the fuselage 14 at a fourth longitudinal coordinate P4 or at a fifth longitudinal coordinate P5, along the longitudinal axis X.

As illustrated in FIGS. 1 to 3, the fourth longitudinal coordinate P4 is to the rear of the third longitudinal coordinate P3, relative to the orientation direction D, and the fifth longitudinal coordinate P5 is to the rear of the fourth longitudinal coordinate P4, relative to the orientation direction D.

The second partition wall 20B is intended to extend substantially perpendicular to the longitudinal axis X and to separate the third cabin portion 16C and the second cabin portion 16B, particularly when the second partition wall 20B is mounted on the fuselage 14.

Advantageously, the first fluid source 28 is configured to supply the first fluid, in particular air, to the first fluid circuit 30. In particular, the first fluid supplied by the first fluid source 28 presents a first set of characteristics. In particular, the first set of characteristics comprises a first temperature, a first pressure, etc.

As illustrated in the example shown in FIGS. 1 to 3, the first fluid source 28 is arranged to the rear of the second cabin portion 16B, in particular to the rear of the third cabin portion 16C, relative to the orientation direction D.

The first fluid circuit 30 is intended to fluidly connect the first fluid source 28 and the second cabin portion 16B.

The first fluid circuit 30 comprises at least one first pipe 32 and at least one first control device 44A.

Advantageously, the first fluid circuit 30 also comprises at least one second control device 44B.

Even more advantageously, the first fluid circuit 30 further comprises at least one intermediate control device 44C.

The following describes an aircraft section 10 in which the first fluid circuit 30 comprises a single pipe 32, a single first control device 44A, if applicable, a single second control device 44B and a single intermediate control device 44C. Of course, the invention also relates to an aircraft portion 10 in which the first fluid circuit 30 comprises a plurality of pipes 32, a plurality of first control devices 44A, if applicable, a plurality of second control devices 44B and/or a plurality of intermediate control devices 44C.

The first pipe 32 comprises a first section 34A and a second section 34B.

Advantageously, the first pipe 32 also comprises a third section 34C.

As illustrated in the example shown in FIGS. 1 to 3, the first pipe 32 extends at least in part according to a first pipe axis A-A', substantially parallel to the longitudinal axis X. In particular, the first section 34A, the second section 34B and/or, if applicable, the third section 34C each extend at least in part according to the first pipe axis A-A'.

The first section 34A is fluidly connected to the first fluid source 28 by the second section 34B, in particular by the second section 34B and the third section 34C.

Advantageously, as illustrated in FIGS. 1 to 3, the first section 34A is further fluidly connected to the third fluid source 118 by a section 124 of at least one auxiliary pipe 122 of the auxiliary fluid circuit 120.

The first section 34A comprises at least one first outlet 36A, in particular a plurality of first outlets 36A, able to deliver the fluid, in particular the first fluid supplied by the first fluid source 28, into the cabin 16 between the first longitudinal coordinate P1 and the second longitudinal coordinate P2.

Advantageously, the at least one first outlet 36A is, in addition, able to deliver the fluid, in particular the third fluid supplied by the third fluid source 118, into the cabin 16 between the first longitudinal coordinate P1 and the second longitudinal coordinate P2.

For example, the second section 34B is fluidly connected to the first fluid source 28 by the third section 34C.

Even more advantageously, the second section 34B is fluidly connected to the third fluid source 118 by the first section 34A, in particular by the first section 34A and by the section 124 of the auxiliary fluid circuit 120.

The second section 34B comprises at least one second outlet 36B, in particular a plurality of second outlets 36B, able to deliver the fluid, in particular the first fluid supplied by the first fluid source 28, into the cabin 16 to the rear of the second longitudinal coordinate P2, advantageously between the second longitudinal coordinate P2 and the third longitudinal coordinate P3.

Advantageously, the at least one second outlet 36B is able to deliver the fluid, in particular the third fluid supplied by the third fluid source 118, into the cabin 16 to the rear of the second longitudinal coordinate P2 relative to the orientation direction D, advantageously between the second longitudinal coordinate P2 and the third longitudinal coordinate P3.

The third section 34c is fluidly connected to the first fluid source 28.

The third section 34C comprises at least one third outlet 36C, in particular a plurality of third outlets 36C, able to deliver the fluid, in particular the fluid supplied by the first fluid source 28, into the cabin 16 to the rear of the third longitudinal coordinate P3, advantageously between the third longitudinal coordinate P3 and the fourth longitudinal coordinate P4.

Advantageously, the first control device 44A fluidly connects the first section 34A and the second section 34B.

The first control device 44A is configurable between an open configuration, in which the first section 34A is in fluid communication with the second section 34B, and a closed configuration, in which fluid communication between the first section 34A and the second section 34B is interrupted.

The first control device 44A is intended to be in the open configuration when the first partition wall 20A is mounted at the first longitudinal coordinate P1 (FIG. 1) or at the third longitudinal coordinate P3 (FIG. 3).

The first control device 44A is intended to be in the closed configuration when the first partition wall 20A is mounted at the second longitudinal coordinate P2 (FIG. 2).

Advantageously, the second control device 44B fluidly connects the second section 34B and the third section 34C.

In particular, the second control device 44B is configurable between an open configuration, in which the second section 34B is in fluid communication with the third section 34C, and a closed configuration, in which fluid communication between the second section 34B and the third section 34C is interrupted.

Advantageously, the second control device 44B is intended to be in the open configuration when the first partition wall 20A is mounted at the first longitudinal coordinate (FIG. 1) or at the second longitudinal coordinate P2 (FIG. 2).

Even more advantageously, the second control device 44B is intended to be in the closed configuration when the first partition wall 20A is mounted at the third longitudinal coordinate P3 (FIG. 3).

Advantageously, the intermediate control device 44C of the first fluid circuit 30 fluidly connects the first section 34A of the first pipe 32 and the section 124 of the auxiliary fluid circuit 120.

In particular, the intermediate control device 44C is configurable between an open configuration, in which the first section 34A of the first pipe 32 is in fluid communication with the section 124 of the auxiliary fluid circuit 120, and a closed configuration, in which fluid communication between the first section 34A of the first pipe 32 and the section 124 of the auxiliary fluid circuit 120 is interrupted.

Advantageously, the intermediate control device 44C is intended to be in the open configuration when the first partition wall 20A is mounted at the second longitudinal coordinate (FIG. 2) or at the third longitudinal coordinate P3 (FIG. 3).

Even more advantageously, the intermediate control device 44C is intended to be in the closed configuration when the first separating wall 20A is mounted at the first longitudinal coordinate P1 (FIG. 1).

When the first control device 44A and the second control device 44B are in the open configuration and the intermediate control device 44C is in the closed configuration (FIG. 1), the first fluid source 28 supplies the first, second and third outlets 36A, 36B, 36C.

When the first control device 44A is in the closed configuration, the second control device 44B is in the open configuration and the intermediate control device 44C is in the open configuration (FIG. 2), the first fluid source 28 supplies the second and third outlets 36B, 36C and the third fluid source 118 supplies the first outlet 36A (the first outlet 36A is then not supplied with fluid by the first fluid source 28).

When the first control device 44A is in the open configuration, the second control device 44B is in the closed configuration and the intermediate control device is in the open configuration (FIG. 3), the first fluid source 28 supplies the third outlet 36C and the third fluid source 118 supplies the first and second outlets 36A, 36B (the first and second outlets 36A, 36B are not supplied with fluid by the first fluid source 28).

Advantageously, the second fluid source 58 is configured to supply the second fluid, in particular air, to the second fluid circuit 60. In particular, the second fluid supplied by the second fluid source 58 presents a second set of characteristics. In particular, the second set of characteristics comprises a second temperature, a second pressure, etc. For example, at least one characteristic of the second set of characteristics is different from the corresponding characteristic of the first set of characteristics of the first fluid.

As illustrated in the example in FIGS. 1 to 3, the second fluid source 58 is arranged to the rear of the second cabin portion 16B, in particular to the rear of the third cabin portion 16C.

The second fluid circuit 60 is intended to fluidly connect the second fluid source 58 and the third cabin portion 16C.

The second fluid circuit 60 comprises at least one second pipe 62 and at least one control device 74A.

Advantageously, the second fluid circuit 60 also comprises at least one intermediate control device 74B.

The following describes an aircraft portion 10 in which the second fluid circuit 60 comprises a single second pipe 62, a single control device 74A and, if applicable, a single intermediate control device 74B. Of course, the invention also relates to an aircraft portion 10 in which the second fluid circuit 60 comprises a plurality of second pipes 62, a plurality of control devices 74A and/or if applicable, a plurality of intermediate control devices 74B.

Advantageously, the second pipe 62 comprises a first section 64A and a second section 64B.

As illustrated in the example in FIGS. 1 to 3, the second pipe 62 extends at least in part according to a second pipe axis B-B', substantially parallel to the longitudinal axis X. In particular, the first section 64A and/or the second section 64B extend at least in part according to the second pipe axis B-B'.

The first section 64A of the second pipe 62 is fluidly connected to the second fluid source 58 by the second section 64B.

Advantageously, the first section 64A of the second pipe 62 is fluidly connected to the first pipe 32 of the first fluid circuit 30, in particular to the third section 34C of the first pipe 32 of the first fluid circuit 30.

Even more advantageously, the first section 64A is fluidly connected to the first fluid source 28, in particular by the first pipe 32 of the first fluid circuit 30, in particular by the third section 34C of the first pipe 32 of the first fluid circuit 30.

The first section 64A comprises at least one first outlet 66A, in particular a plurality of first outlets 66A, able to deliver the fluid, in particular the second fluid supplied by the second fluid source 58, into the cabin 16 between fourth longitudinal coordinate P4 and the fifth longitudinal coordinate P5.

Advantageously, the at least one first outlet 66A is further able to deliver the first fluid supplied by the first fluid source 28, into the cabin 16 between the fourth longitudinal coordinate P4 and the fifth longitudinal coordinate P5.

Advantageously, the second section 64B is fluidly connected to the second fluid source 58. In particular, the second section 64B is in fluid communication with the second fluid source 58.

The second section 64B comprises at least one second outlet 66B, in particular a plurality of second outlets 66B, able to deliver the fluid, in particular the second fluid supplied by the second fluid source 58, into the cabin 16 to the rear of the fifth longitudinal coordinate P5.

Advantageously, the control device 74A of the second fluid circuit 60 fluidly connects the first section 64A and the second section 64B.

The control device 74A of the second fluid circuit 60 is configurable between an open configuration, in which the first section 64A is in fluid communication with the second section 64B, and a closed configuration, in which fluid communication between the first section 64A and the second section 64B is interrupted.

The control device 74A of the second fluid circuit 60 is intended to be in the open configuration when the second partition wall 20B is mounted at the fourth longitudinal coordinate P4 (FIGS. 1 and 2).

The control device 74B of the second fluid circuit 60 is intended to be in the closed configuration when the second partition wall 20B is mounted at the fifth longitudinal coordinate P5 (FIG. 3).

Advantageously, the intermediate control device 74B of the second fluid circuit 60 fluidly connects the first pipe 32 and the second pipe 62, in particular the third section 34C of the first pipe 32 and the first section 64A of the second pipe 62.

In particular, the intermediate control device 74B of the second fluid circuit 60 is configurable between an open configuration, in which the first pipe 32, in particular the third section 34C of the first pipe 32, is in fluid communication with the second pipe 62, in particular the first section 64A of the second pipe 62, and a closed configuration, in which the fluid communication between the first pipe 32, in particular the third section 34C of the first pipe 32, and the second pipe 62, in particular the first section 64A of the second pipe 62, is interrupted.

Advantageously, the intermediate control device 74B is intended to be in the closed configuration when the second partition wall 20B is mounted at the fourth longitudinal coordinate P4 (FIGS. 1 and 2).

Even more advantageously, the intermediate control device 74B is intended to be in the open configuration when the second partition wall 20B is mounted at the fifth longitudinal coordinate P5 (FIG. 3).

When the control device 74A of the second fluid circuit 60 is in the open configuration and the intermediate control device 74B of the second fluid circuit 60 is in the closed configuration (FIGS. 1 and 2), the second fluid source 58 supplies the first and second outlets 66A, 66B.

When the control device 74A of the second fluid circuit 60 is in the closed configuration and the intermediate control device 74B of the second fluid circuit 60 is in the open configuration (FIG. 3), the first fluid source 28 supplies the first outlet 66A and the second fluid source 58 supplies the second outlet 66B.

According to the example in FIGS. 1 to 3, the third fluid source 118 is configured to supply the third fluid, in particular air, to the auxiliary fluid circuit 120. In particular, the fluid supplied by the third fluid source 118 presents a third set of characteristics. In particular, the third set of characteristics includes a third temperature, a third pressure, etc. For example, at least one characteristic of the third set of characteristics is different from the corresponding characteristic of the first set of characteristics of the first fluid or from the corresponding characteristic of the second set of characteristics of the second fluid.

As illustrated in the example in FIGS. 1 to 3, the third fluid source 118 is arranged in front of the first cabin portion 16A.

The auxiliary fluid circuit 120 is intended to fluidly connect the third fluid source 118 and the first cabin portion 16A.

The auxiliary fluid circuit 120 comprises at least one auxiliary pipe 122. In the following, an aircraft portion 10 is described in which the auxiliary fluid circuit 120 comprises a single auxiliary pipe 122. Of course, the invention also relates to an aircraft portion 10 in which the auxiliary fluid circuit 120 comprises a plurality of auxiliary pipes 122.

The auxiliary pipe 122 comprises a pipe section 124.

As illustrated in the example in FIGS. 1 to 3, the auxiliary pipe 122 extends at least in part according to a third pipe axis C-C', substantially parallel to the longitudinal axis X. In particular, the section 124 extends at least in part according to the third pipe axis C-C'.

The section 124 is fluidly connected to the third fluid source 118.

The section 124 comprises, for example, at least one outlet 126, in particular a plurality of outlets 126, able to deliver fluid, in particular the third fluid supplied by the third fluid source 118, into the cabin 16 in front of the first longitudinal coordinate P1 relative to the orientation direction D.

In the following, with reference to FIGS. 4 to 7, each control device 44 (44A, 44B, 44C), 74 (74A, 74B) is described in greater detail.

In particular, a single control device 44, 74 is described. The description naturally applies to each control device 44, 74, except where otherwise specified.

The control device 44, 74 comprises a support 80 and a control assembly 90.

Advantageously, the control device 44, 74 also comprises a seal 110.

As will be detailed below, the control device 44, 74 is:

in a closed configuration when a closing element 92 of the control assembly 90 is mounted on the support 80; and in an open configuration when a covering element 102 of the control assembly 90 is mounted on the support 80.

With reference to FIGS. 4 to 7, the support 80 is permanently mounted on the corresponding sections 34A, 34B, 34C, 64A, 64B, 124 of the corresponding pipe(s) 32, 62, 122 so as to fluidly connect the corresponding sections 34A, 34B, 34C, 64A, 64B, 124 of the corresponding pipe(s) 32, 62.

By way of example, the support 80 of the first control device 44A is permanently mounted on sections 34A and 34B of the first pipe 32 so as to fluidly connect the sections 34A and 34B of the first pipe 32.

Advantageously, the support 80 of the intermediate control device 74B is permanently mounted on the third section 34C of the first pipe 32 and on the first section 64A of the second pipe 62 so as to fluidly connect the third section 34C of the first pipe 32 and the first section 64A of the second pipe 62.

With reference to FIGS. 4 to 7, the support 80 comprises a tubular wall 82 delimiting a fluid circulation passage 84 between the corresponding sections 34A, 34B, 34C, 64A, 64B, 124 of the corresponding pipe(s) 32, 62, 122.

The tubular wall 82 comprises an insertion slot 86. The insertion slot 86 advantageously communicates with the fluid circulation passage 84.

The control assembly 90 comprises the closing element 92 and the covering element 102.

Figure 4:
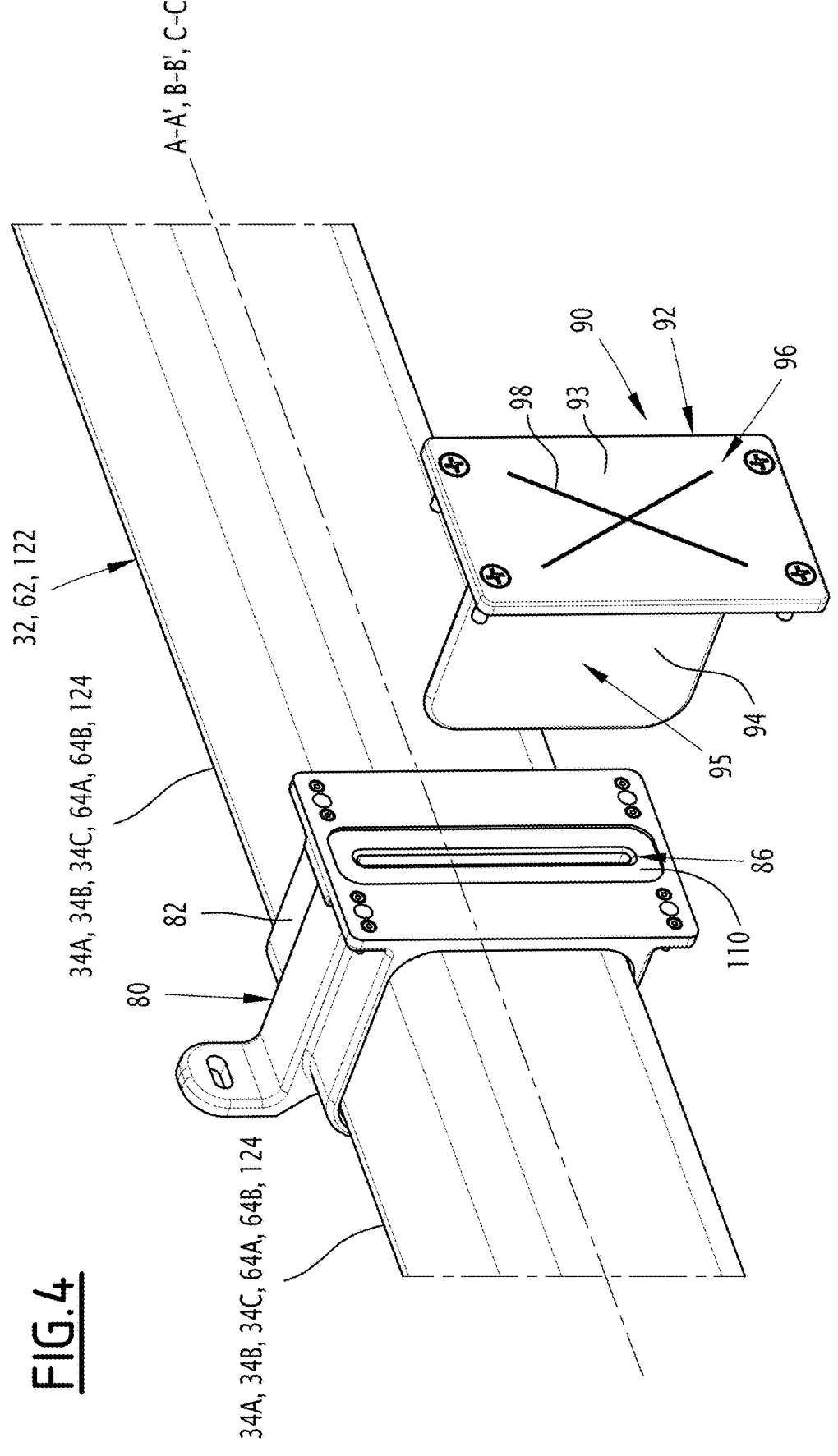
FIG. 4 is a schematic representation of a perspective view of two fluid circuit pipe sections and a control device of the aircraft portion of FIG. 1, in particular a support and a closing element of the control device, the closing element being illustrated at a distance from the support, the corresponding pipe(s) extending according to the same pipe axis.
Figure 5:
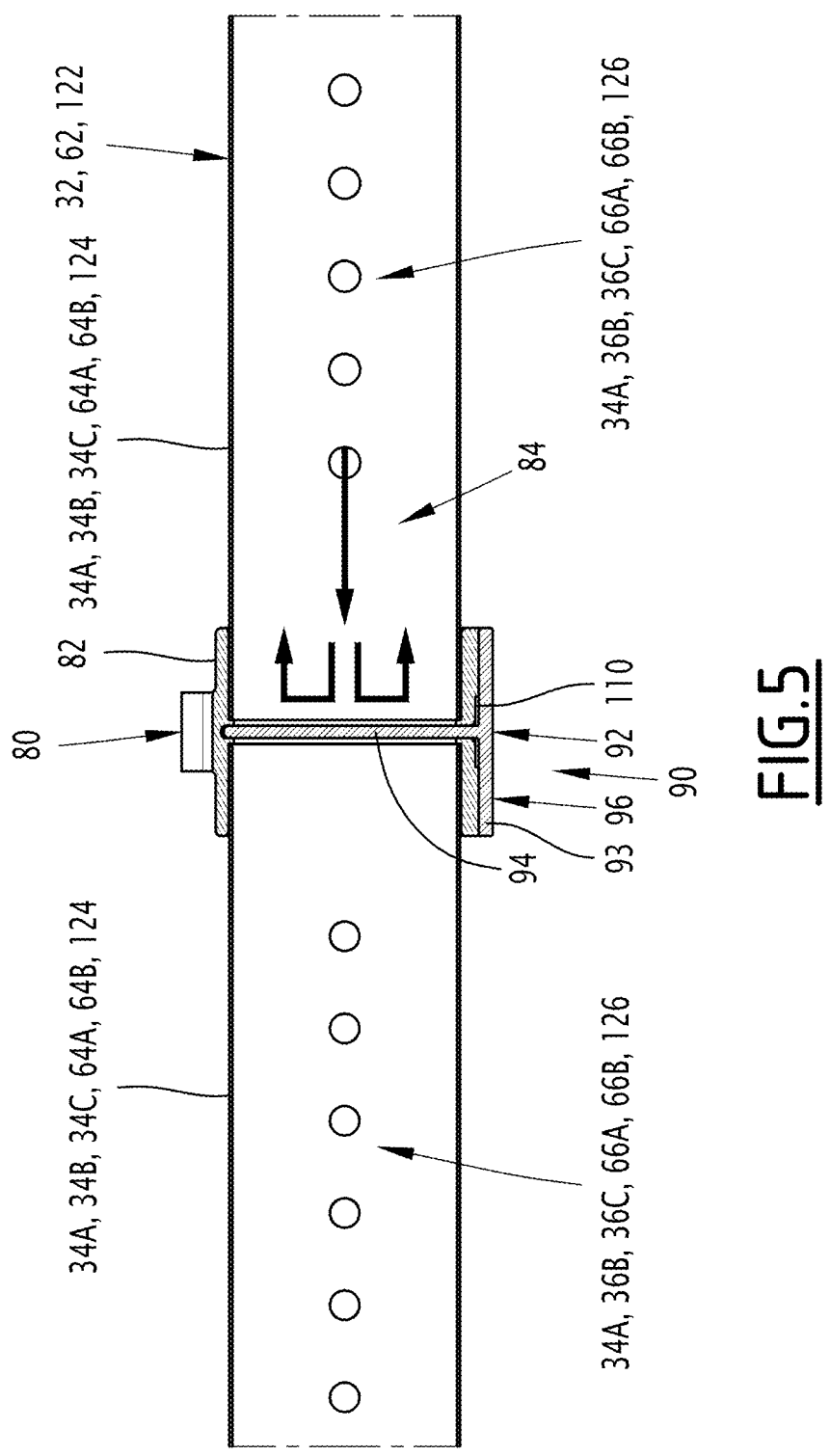
FIG. 5 is a schematic representation of a cross-sectional view of the two fluid circuit pipe sections and the control device of FIG. 4 according to a cross-sectional plane parallel to the corresponding pipe axis, the closing element being illustrated mounted on the support so as to interrupt the fluid communication between the corresponding pipe sections.

With reference to FIGS. 4 and 5, the closing element 92 is able to be removably mounted on the support 80, in particular by screwing, so as to interrupt fluid communication between the corresponding sections 34A, 34B, 34C, 64A, 64B, 124 of the corresponding pipe(s) 32, 62, 122.

In particular, the closing element 92 comprises an interruption plate 94 intended to be inserted into the corresponding fluid circulation passage 84 through the corresponding insertion slot 86, in particular when the closing element is mounted on the support 80, so as to interrupt fluid communication between the corresponding sections 34A, 34B, 34C, 64A, 64B, 124 of the corresponding pipe 32, 62, 122.

In addition, advantageously, the closing element 92 comprises a base 93 on which the interruption plate 94 is mounted. As illustrated in the example in FIGS. 4 and 5, when the closing element 92 is mounted on the support 80, the interruption plate 94 extends into the fluid circulation passage 84 and the base 93 is screwed to the support 80 so as to hold the interruption plate 94 in the passage 84.

Advantageously, the base 93 and the interruption plate 94 are integral.

Advantageously, the closing element 92 comprises an inner surface 95 oriented in the direction of the support 80 when the closing element 92 is mounted on the support 80, and an outer surface 96 opposite the inner surface 95. In particular, the inner surface 95 of the closing element 92 is formed by an inner surface of the base 93, oriented in the direction of the support 80 when the closing element is mounted on the support 80, and by a surface of the interruption plate 94. The outer surface 96 of the closing element 92 is formed by an outer surface of the base 93 opposite the inner surface of the base 93.

Advantageously, as illustrated in FIG. 4, the outer surface 96 of the closing element 92 includes a closed configuration indicator 98. For example, the closed configuration indicator 98 is a ballot cross. The closed configuration indicator 98 allows an operator to easily recognize that a control device 44, 74 is in closed configuration, when they see the closed configuration indicator 98 on the outer surface 96 of the closing element 92 mounted on said control device 44, 74.

Figure 6:
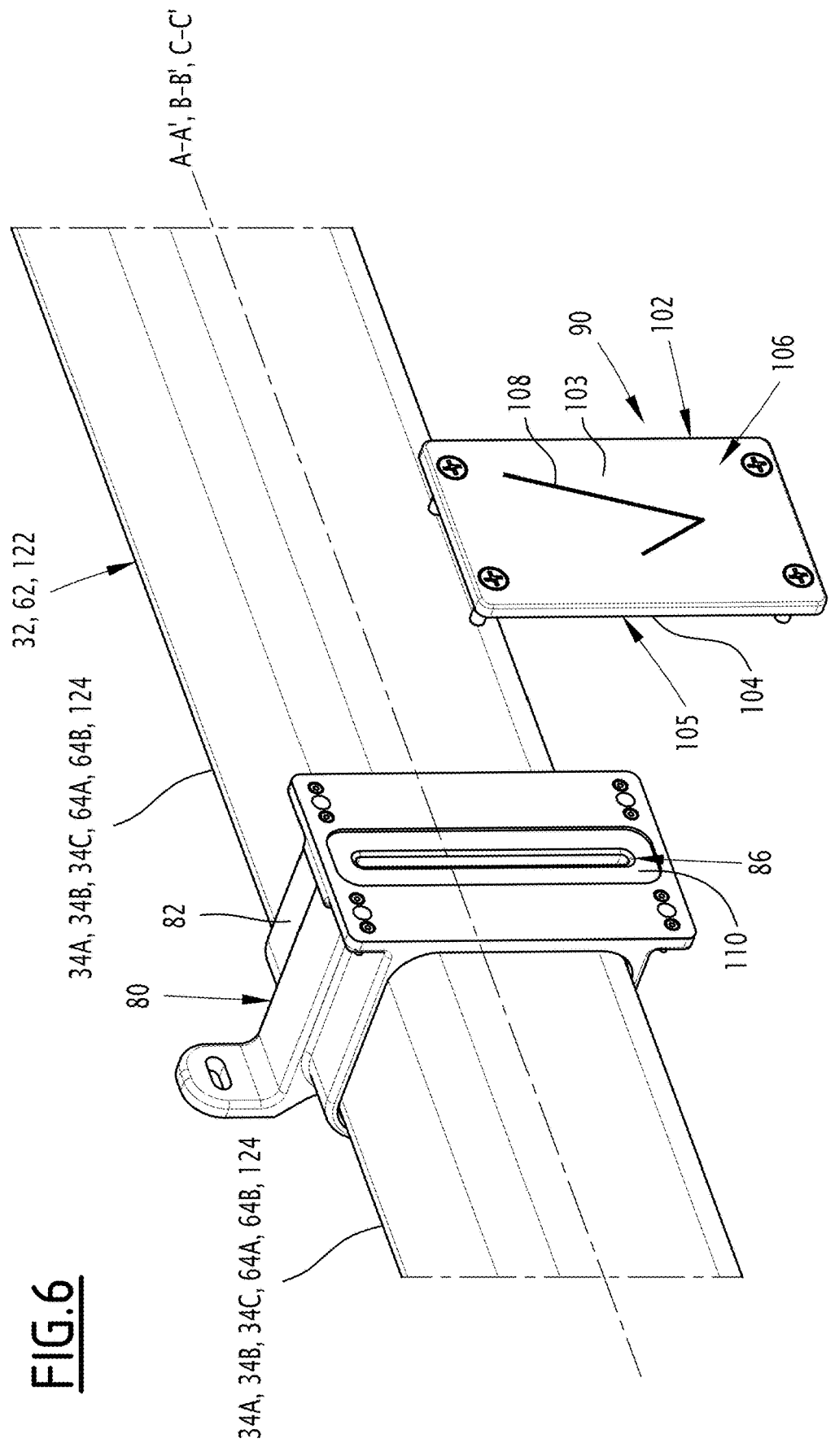
FIG. 6 is a schematic representation of a perspective view of two fluid circuit pipe sections and a control device of the aircraft portion of FIG. 1, in particular a support and a covering element of the control device, the covering element being illustrated at a distance from the support, the corresponding pipe(s) extending according to the same pipe axis.
Figure 7:
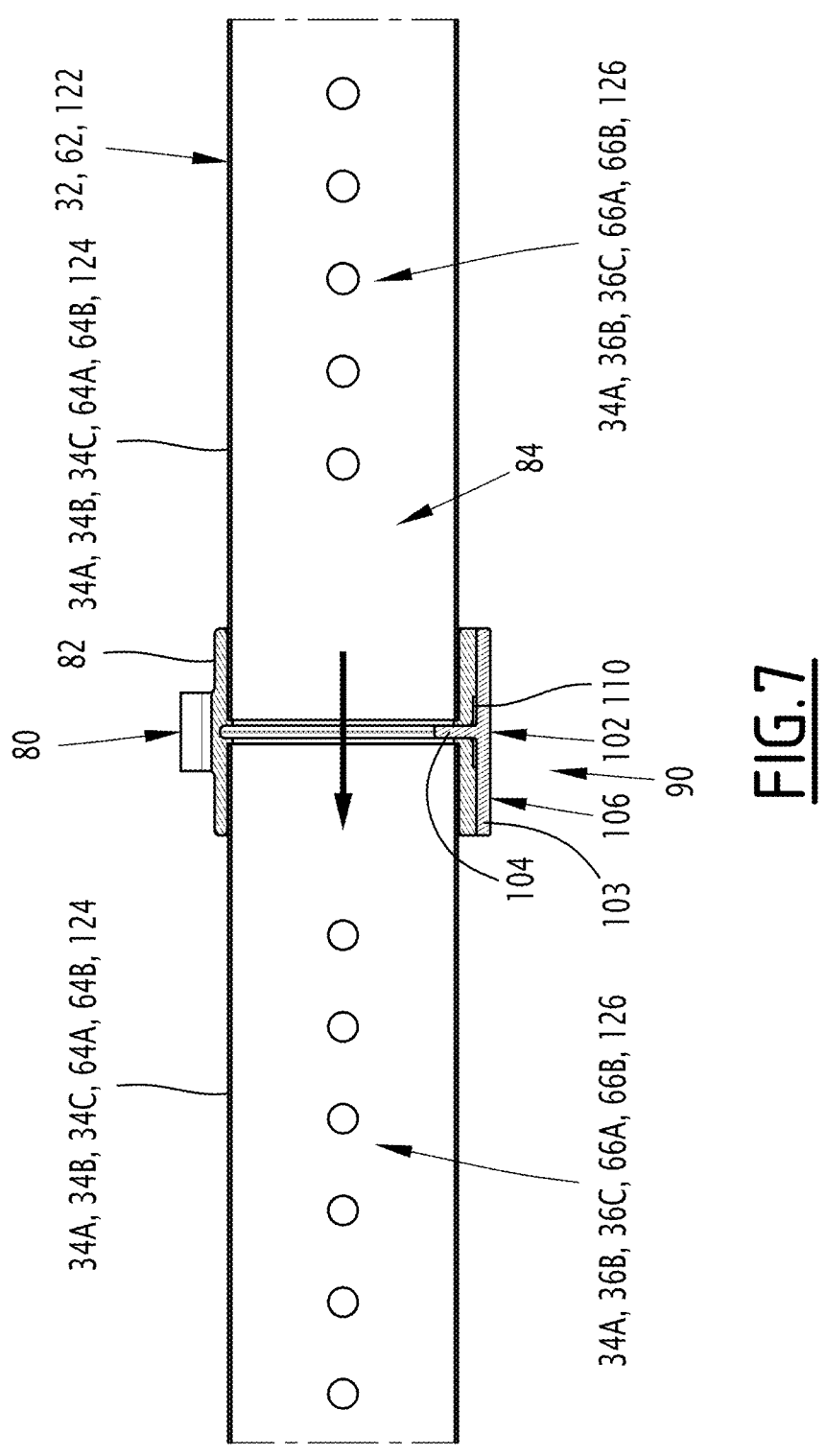
FIG. 7 is a schematic representation of a cross-sectional view of the two fluid circuit pipe sections and the control device of FIG. 6 according to a cross-sectional plane parallel to the corresponding pipe axis, the covering element being shown mounted on the support so as to allow fluid communication between the corresponding pipe sections.

With reference to FIGS. 6 and 7, the covering element 102 is able to be removably mounted on the support 80, in particular by screwing, as a replacement for the closing element 92, so as to allow fluid communication between the corresponding sections 34A, 34B, 34C, 64A, 64B, 124 of the corresponding pipe(s) 32, 62, 122.

In particular, the covering element 102 comprises a cover 104 intended to close the insertion slot 86, in particular, when the covering element 102 is mounted on the support 80.

In addition, for example, the covering element 102 comprises a base 103 on which the cover 104 is mounted. As illustrated in the example in FIGS. 6 and 7, when the covering element 102 is mounted on the support 80, the cover 104 covers, and in particular closes, the insertion slot 86 and the base 103 is screwed to the support 80 so as to hold the cover 104 over the insertion slot 86.

Advantageously, the base 103 and the cover 104 are integral.

Even more advantageously, as illustrated in the example in FIG. 7, the base 103 and the cover 104 form a single piece.

Even more advantageously, the covering element 102 comprises an inner surface 105 oriented in the direction of the support 80 when the covering element 102 is mounted on the support 80, and an outer surface 106 opposite the inner surface 105. In particular, the inner surface 105 of the covering element 102 is formed by an inner surface of the base 103 and/or the cover 104, oriented in the direction of the support 80 when the covering element 102 is mounted on the support 80, and by a surface of the interruption plate 94.

The outer surface 106 of the covering element 102 is formed by an outer surface of the base 93 opposite the inner surface of the base 93.

Advantageously, as illustrated in FIG. 6, the outer surface 106 of the covering element 102 includes an open configuration indicator 108. For example, the open configuration indicator 108 is a check mark. The open configuration indicator 108 allows an operator to easily recognize that a control device 44, 74 is in the open configuration, when they see the open configuration indicator 108 on the outer surface 106 of the covering element 102 mounted on said control device 44, 74.

With reference to FIGS. 4 to 7, the seal 110 is arranged on the support 80, about the corresponding insertion slot 86, so that the closing element 92, respectively the covering element 102, cooperates with the corresponding seal 110 when the closing element 92, respectively the covering element 102, is mounted on the support 80, so as to prevent the passage of fluid through the insertion slot 86.

Figure 8:
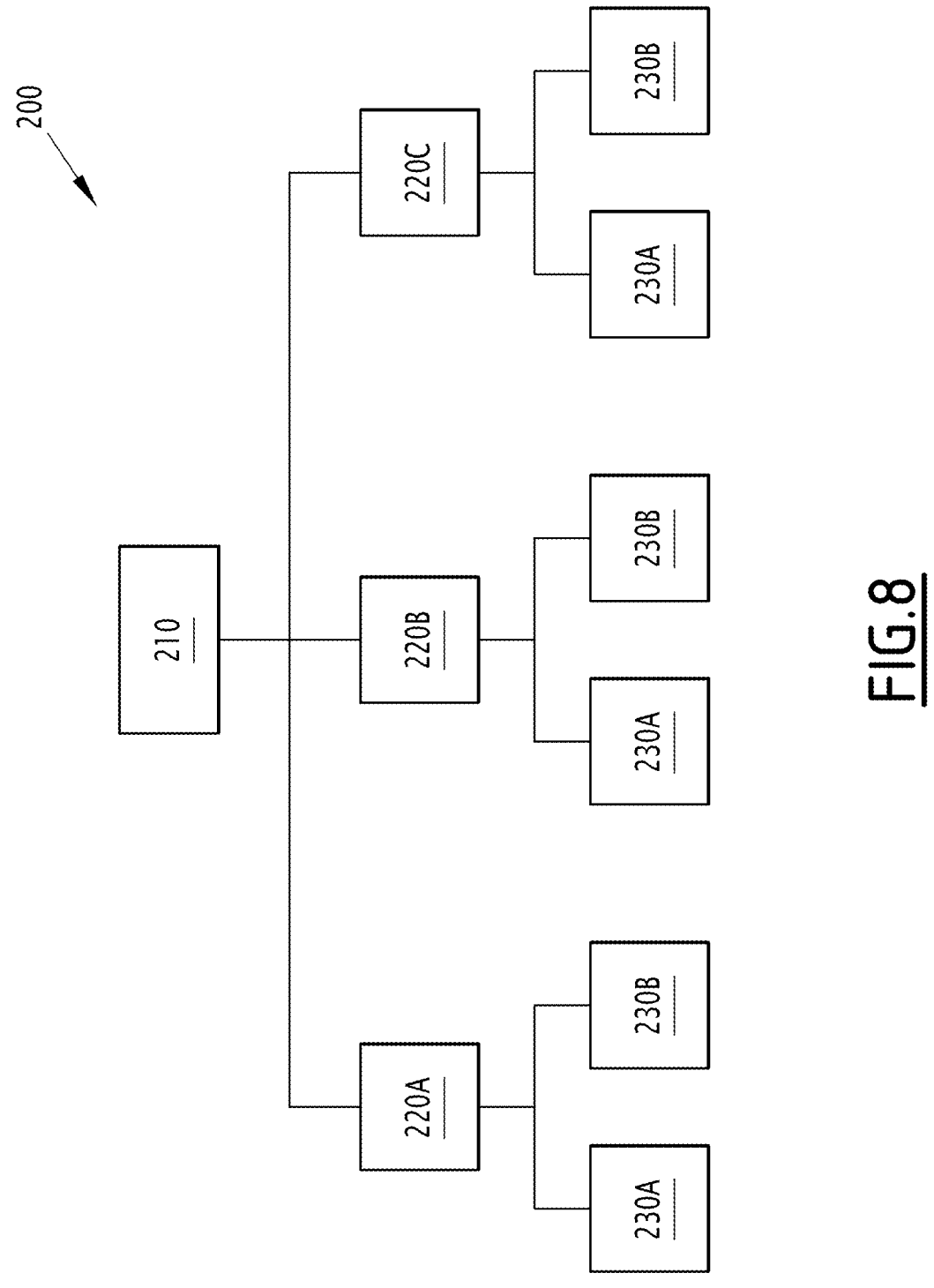
FIG. 8 is a schematic representation of an aircraft section arrangement method, according to the current disclosure.

With reference to FIG. 8, an arrangement method 200 for arranging at least one aircraft portion 10 such as described above is described.

The method 200 advantageously comprises supplying 210 the aircraft portion 10.

For example, the method 200 also comprises a step 220A for mounting the first partition wall 20A at the first longitudinal coordinate P1.

During the step 220A, the first control device 44A of the first fluid circuit 30 is configured in the open configuration.

Advantageously, during the step 220A, the second control device 44B of the first fluid circuit 30 is also configured in the open configuration.

Even more advantageously, during the step 220A, the intermediate control device 44C of the first fluid circuit 30 is configured in the closed configuration.

As an alternative to the step 220A, the method 100 comprises a step 220B for mounting the first partition wall 20A at the second longitudinal coordinate P2.

During the step 220B, the first control device 44A of the first fluid circuit 30 is configured in the closed configuration.

Advantageously, during the step 220B, the second control device 44B of the first fluid circuit 30 is configured in the open configuration.

Even more advantageously, during the step 220B, the intermediate control device 44C of the first fluid circuit 30 is configured in the open configuration.

For example, as an alternative to the step 220A and the step 220B, the method 200 comprises a step 220C of mounting the first partition wall 20A at the third longitudinal coordinate P3.

During the step 220C, the second control device 44B of the first fluid circuit 30 is configured in the closed configuration.

For example, during the step 220C, the first control device 44A of the first fluid circuit 30 is configured in the open configuration.

In particular, during the step 220C, the intermediate control device 44C of the first fluid circuit 30 is configured in the open configuration.

For example, and in particular, after the step 220A, 220B or if applicable, 220C, the method 200 further comprises a step 230A of mounting the second partition wall 20B at the fourth longitudinal coordinate P4.

During step 230A, the control device 74A of the second fluid circuit 60 is configured in the open configuration.

Advantageously, during the step 230A, the intermediate control device 74B of the second fluid circuit 60 is configured in the closed configuration.

As an alternative to the step 230A, the method 200 comprises a step 230B for mounting the second partition wall 20B at the fifth longitudinal coordinate P5.

During the step 230B, the control device 74A of the second fluid circuit 60 is configured in the closed configuration.

Advantageously, during the step 230B, the intermediate control device 74B of the second fluid circuit 60 is configured in the open configuration.

According to one particular example, the method 200 comprises:

for a first aircraft portion 10 of a first aircraft, as described above, performing the step 220A; and for a second aircraft portion 10 of a second aircraft, as described above, performing the step 220B.

Advantageously, the first pipe 32 of the first fluid circuit 30 of the first aircraft portion 10 is identical to the first pipe 32 of the first fluid circuit 30 of the second aircraft portion 10.

Even more advantageously, the first aircraft portion 10 and the second aircraft portion 10 comprise substantially identical first P1 and second P2 longitudinal coordinates.

In particular, for each of the first and second aircraft portions 10, one from among the steps 220A, 220B, 220C is performed and, if applicable, one from among the steps 230A, 230B is performed, without it being necessary to perform the same combinations of steps in the first and second aircraft portions 10.

Advantageously, the first aircraft portion 10 and the second aircraft portion 10 comprising substantially identical third P3, fourth P4 and fifth P5 longitudinal coordinates and second pipes 62.

The method 200 thus allows different arrangements to be provided for several distinct aircraft when assembling said aircraft, as a function in particular of the wishes of the users of the aircraft, in particular relating to the positioning of the first partition wall 20A and/or the second partition wall 20B along the longitudinal axis X at the various longitudinal positions P1, P2 and/or P3, and if applicable, P4 and/or P5.

What is claimed is:

1. An aircraft portion comprising:

a fuselage delimiting a cabin extending according to a longitudinal axis, the cabin comprising a first cabin portion and a second cabin portion;

a first partition wall configured to extend substantially perpendicular to the longitudinal axis and configured to separate the first cabin portion and the second cabin portion, the first partition wall being configured to be mounted on the fuselage at a first longitudinal coordinate or at a second longitudinal coordinate along the longitudinal axis, the second longitudinal coordinate being located to a rear of the first longitudinal coordinate relative to an orientation direction substantially parallel to the longitudinal axis; and at least one first fluid circuit configured to fluidly connect at least one first source of a first fluid and the second cabin portion, the at least one first fluid circuit comprising:

at least one first pipe including:

a first section comprising at least one first outlet configured to deliver the first fluid into the cabin between the first longitudinal coordinate and the second longitudinal coordinate; and a second section comprising at least one second outlet configured to deliver the first fluid into the cabin to the rear of the second longitudinal coordinate relative to the orientation direction, the first section of the at least one first pipe being configured to be fluidly connected to the at least one first source by the second section of the at least one first pipe;

at least one first control device configurable between an open configuration, wherein, the first section of the at least one first pipe is in fluid communication with the second section of the at least one first pipe, and a closed configuration, wherein, fluid communication between the first section of the at least one first pipe and the second section of the at least one first pipe is interrupted;

wherein the at least one first control device of the at least one first fluid circuit is configured to be in the open configuration when the first partition wall is mounted at the first longitudinal coordinate, and wherein the at least one first control device of the at least one first fluid circuit is configured to be in the closed configuration when the first partition wall is mounted at the second longitudinal coordinate.

2. The aircraft portion according to claim 1, wherein the first partition wall is, in addition, configured to be mounted on the fuselage at a third longitudinal coordinate, the third longitudinal coordinate being located to the rear of the second longitudinal coordinate relative to the orientation direction, wherein the at least one second outlet is configured to deliver the first fluid into the cabin between the second longitudinal coordinate and the third longitudinal coordinate, wherein the at least one first pipe includes a third section comprising at least one third outlet configured to deliver the first fluid into the cabin to the rear of the third longitudinal coordinate relative to the orientation direction, the second section of the at least one first pipe being configured to be fluidly connected to the at least one first source by the third section of the at least one first pipe, wherein the at least one first fluid circuit further comprises at least one second control device configurable between an open configuration, wherein, the second section of the at least one first pipe is in fluid communication with the third section of the at least one first pipe, and a closed configuration, wherein, fluid communication between the second section of the at least one first pipe and the third section of the at least one first pipe is interrupted;

wherein when the at least one first partition wall is mounted at the second longitudinal coordinate or at the first longitudinal coordinate, the at least one second control device of the at least one first fluid circuit is configured to be in the open configuration;

wherein when the first partition wall is mounted at the third longitudinal coordinate, the at least one second control device of the at least one first fluid circuit is configured to be in the closed configuration.

3. The aircraft portion according to claim 2, wherein the cabin comprises a third cabin portion, the aircraft portion further comprising:

a second partition wall configured to extend substantially perpendicular to the longitudinal axis and configured to separate the third cabin portion and the second cabin portion, the second partition wall being configured to be mounted on the fuselage at a fourth longitudinal coordinate or at a fifth longitudinal coordinate, the fourth longitudinal coordinate being located to the rear of the third longitudinal coordinate relative to the orientation direction, the fifth longitudinal coordinate being located to the rear of the fourth longitudinal coordinate relative to the orientation direction;

at least one second fluid circuit configured to fluidly connect to at least one second source of a second fluid and the third cabin portion, the at least one second fluid circuit comprising:

at least one second pipe including:

a first section comprising at least one first outlet configured to deliver the second fluid into the cabin between the fourth longitudinal coordinate and the fifth longitudinal coordinate; and a second section comprising at least one second outlet configured to deliver the second fluid into the cabin to the rear of the fifth longitudinal coordinate relative to the orientation direction, the first section of the at least one second pipe being configured to be fluidly connected to the at least one second source by the second section of the at least one second pipe;

at least one control device configurable between an open configuration, wherein, the first section of the at least one second pipe is in fluid communication with the second section of the at least one second pipe, and a closed configuration, wherein, fluid communication between the first section of the at least one second pipe and the second section of the at least one second pipe is interrupted;

wherein the at least one control device of the at least one second fluid circuit is configured to be in the open configuration when the second partition wall is mounted at the fourth longitudinal coordinate;

wherein the at least one control device of the at least one second fluid circuit is configured to be in the closed configuration when the second partition wall is mounted at the fifth longitudinal coordinate.

4. The aircraft portion according to claim 3, wherein the third section of the at least one first pipe is configured to be fluidly connected to the at least one first source, the first section of the at least one second pipe being configured to be fluidly connected to the third section of the at least one first pipe, the at least one second fluid circuit including at least one intermediate control device configurable between an open configuration, wherein, the first section of the at least one second pipe is in fluid communication with the third section of the at least one first pipe, and a closed configuration, wherein, fluid communication between the first section of the at least one second pipe and the third section of the at least one first pipe is interrupted, wherein when the second partition wall is mounted at the fourth longitudinal coordinate, the at least one intermediate control device of the at least one second fluid circuit is configured to be in the closed configuration;

wherein when the second partition wall is mounted at the fifth longitudinal coordinate, the at least one intermediate control device of the at least one second fluid circuit is configured to be in the open configuration.

5. The aircraft portion according to claim 1, wherein each control device comprises:

a support permanently mounted on the corresponding sections of the corresponding pipe(s) so as to fluidly connect the corresponding sections of the corresponding pipe(s); and a control assembly comprising:

a closing element configured to be removably mounted on said support so as to interrupt fluid communication between the corresponding sections of the corresponding pipe(s); and a covering element configured to be removably mounted on said support in place of the closing element so as to allow fluid communication between the corresponding sections of the corresponding pipe(s); and in which each control device is:

in a closed configuration when the closing element is mounted on said support;

in an open configuration when the covering element is mounted on said support.

6. The aircraft portion according to claim 5, wherein the support of each control device comprises a tubular wall delimiting a fluid flow passage between the corresponding sections of the corresponding pipe(s), the tubular wall of the support of each control device comprises an insertion slot, the closing element of each control device comprising an interruption plate configured to be inserted into said fluid flow passage through said insertion slot so as to interrupt the fluid communication between the sections of the corresponding pipe(s) when the closing element is mounted on said support.

7. The aircraft portion according to claim 6, wherein the covering element of each control device comprises a cover configured to close the insertion slot when the covering element is mounted on said support.

8. The aircraft portion according to claim 6, wherein, each control device comprises a seal arranged around the corresponding insertion slot, the closing element, respectively the covering element, cooperating with the corresponding seal when the closing element, respectively the covering element, is mounted on the support, so as to prevent the passage of fluid through the insertion slot.

9. The aircraft portion according to claim 5, wherein the closing element and the covering element of each control device are each configured to be mounted on said support by screwing.

10. The aircraft portion according to claim 5, wherein the closing element, respectively the covering element, of each control device comprises an inner surface oriented towards the support when said closing element, respectively said covering element, is mounted on said support, and an outer surface opposite to the inner surface, the outer surface of said closing element including a closed configuration indicator and the outer surface of said covering element including an open configuration indicator different from the closed configuration indicator.

11. An arrangement method for at least one of the aircraft portion according to claim 1, comprising the following steps:

a) mounting the first partition wall at the first longitudinal coordinate and configuring the at least one first control device of the at least one first fluid circuit in the open configuration; or b) mounting the first partition wall at the second longitudinal coordinate and configuring the at least one first control device of the at least one first fluid circuit in the closed configuration.

12. The arrangement method according to claim 11, wherein, in the step b), at least one second control device of the at least one first fluid circuit is configured in the open configuration so that the second section of the at least one first pipe is in fluid communication with a third section of the at least one first pipe, the third section comprising at least one third outlet configured to deliver the first fluid into the cabin to the rear of a third longitudinal coordinate relative to the orientation direction, the second section of the at least one first pipe being configured to be fluidly connected to the at least one first source by the third section of the at least one first pipe, the third longitudinal coordinate being to the rear of the second longitudinal coordinate relative to the orientation direction, the method further comprising, as an alternative to steps a) and b), the following step:

c) mounting the first partition wall at the third longitudinal coordinate and configuring the at least one second control device of the at least one first fluid circuit in a closed configuration wherein, fluid communication between the second section of the at least one first pipe and the third section of the at least one first pipe is interrupted.

13. The arrangement method according to claim 12, further comprising the following step:

d) mounting a second partition wall at a fourth longitudinal coordinate so that the second partition wall extends substantially perpendicular to the longitudinal axis and separates a third cabin portion and the second cabin portion, the fourth longitudinal coordinate being located to the rear of the third longitudinal coordinate relative to the orientation direction, and configuring at least one control device of at least one second fluid circuit in an open configuration wherein, a first section of at least one second pipe of the at least one second fluid circuit is in fluid communication with a second section of the at least one second pipe, the first section of the at least one second pipe comprising at least one first outlet configured to deliver a second fluid into the cabin between the fourth longitudinal coordinate and a fifth longitudinal coordinate located to the rear of the fourth longitudinal coordinate relative to the orientation direction, the second section of the at least one second pipe comprising at least one second outlet configured to deliver the second fluid into the cabin to the rear of the fifth longitudinal coordinate relative to the orientation direction, the first section of the at least one second pipe being configured to be fluidly connected to at least one second source of the second fluid by the second section of the at least one second pipe.

14. The arrangement method according to claim 13, further comprising as an alternative to the step d), the following step:

e) mounting the second partition wall at the fifth longitudinal coordinate so that the second partition wall extends substantially perpendicular to the longitudinal axis and separates the third cabin portion and the second cabin portion, and configuring the at least one control device of the at least one second fluid circuit in a closed configuration wherein, fluid communication between the first section of the at least one second pipe and the second section of the at least one second pipe is interrupted.

15. The arrangement method according to claim 14,
wherein during the step d), at least one intermediate
control device of the at least one second fluid circuit is
configured in a closed configuration so that fluid com-
munication between the first section of the at least one
second pipe and the third section of the at least one first
pipe is interrupted, the third section of the at least one
first pipe being configured to be fluidly connected to the
at least one first source; and
wherein during the step e), the at least one intermediate
control device of the at least one second fluid circuit is
configured in an open configuration so that the first
section of the at least one second pipe is in fluid
communication with the third section of the at least one
first pipe.

16. The arrangement method according to claim 11,
comprising:
for a first aircraft portion of a first aircraft, the mounting
of the first partition wall at the first longitudinal coor-
dinate and configuring the at least one first control
device of the at least one first fluid circuit in the open
configuration; and
for a second aircraft portion of a second aircraft, the
mounting of the first partition wall at the second
longitudinal coordinate and configuring the at least one
first control device of the at least one first fluid circuit
in the closed configuration;
the at least one first pipe of the first fluid circuit of the first
aircraft portion being identical to the at least one first
pipe of the first fluid circuit of the second aircraft
portion.

* * * * *